United States Patent
Petranovich et al.

[19]

[11] Patent Number: 5,937,010
[45] Date of Patent: Aug. 10, 1999

[54] SAMPLE INTERPOLATOR AND METHOD OF GENERATING ADDITIONAL SAMPLES OF A SAMPLED WAVEFORM USING A PROGRAMMABLE SAMPLE DIVIDER

[75] Inventors: James E. Petranovich; F. Matthew Rhodes, both of Encinitas, Calif.

[73] Assignee: Rockwell Semiconductor Systems, Inc., Newport Beach, Calif.

[21] Appl. No.: 08/918,941

[22] Filed: Aug. 25, 1997

Related U.S. Application Data

[63] Continuation of application No. 08/707,029, Sep. 10, 1996, abandoned, which is a continuation of application No. 08/476,692, Jun. 7, 1995, abandoned, which is a division of application No. 08/330,577, Oct. 27, 1994, Pat. No. 5,600,678, which is a continuation of application No. 07/858,397, Mar. 26, 1992, Pat. No. 5,420,887.

[51] Int. Cl.$^6$ .................................................. H04L 27/04
[52] U.S. Cl. ............................ 375/295; 364/723; 364/768
[58] Field of Search ..................................... 375/295, 377; 364/723, 577, 474.3, 768; 395/2.74; 370/84; 704/265

[56] References Cited

U.S. PATENT DOCUMENTS

| | | | |
|---|---|---|---|
| 4,313,173 | 1/1982 | Candy | 364/723 |
| 4,630,283 | 12/1986 | Schiff | 375/1 |
| 4,756,008 | 7/1988 | Yagi et al. | 375/281 |
| 4,761,798 | 8/1988 | Griswold, Jr. et al. | 375/59 |
| 4,843,613 | 6/1989 | Crowle | 375/59 |
| 4,912,722 | 3/1990 | Carlin | 375/1 |
| 4,962,510 | 10/1990 | McDavid et al. | 375/67 |
| 5,018,090 | 5/1991 | Shiratsuchi | 364/723 |
| 5,136,614 | 8/1992 | Hiramatsu et al. | 375/1 |
| 5,144,640 | 9/1992 | Yamamoto | 375/1 |
| 5,168,505 | 12/1992 | Akazawa et al. | 375/1 |
| 5,175,701 | 12/1992 | Newman et al. | 364/723 |
| 5,235,534 | 8/1993 | Potter | 364/724 |
| 5,258,938 | 11/1993 | Akamatsu | 364/723 |

OTHER PUBLICATIONS

Curtis A. Siller, Jr., Walter Debus, Thomas L. Osborne; *IEEE Communications Magazine*, Feb. 1989; "Spectral Shaping and Digital Synthesis of an M–ary Time Series"; pp. 15–24.

*Primary Examiner*—Don N. Vo
*Attorney, Agent, or Firm*—Fish & Richardson P.C.

[57] ABSTRACT

A programmable digital modulator and methods of modulating digital data for transmission by a communication system according to operating parameters selected for various applications are provided. A two-chip system is utilized by a preferred embodiment of the invention. One chip comprises a PROM for storing impulse response data which would result from filtering the data to be transmitted. The second chip comprises a data interface for accepting input data, an address generator for generating an address of the PROM where the impulse response data is stored which corresponds to the data input to the chip and for causing the PROM to output the impulse response data stored at the address generated, and a data modulator for modulating a carrier signal with the impulse response data provided by the PROM. To account for intersymbol interference which occurs in some types of digital communications, an accumulator is further provided by the second chip for summing impulse response data associated with more than one input where the impulse response data overlap in time. An interpolator is also provided by the second chip to generate additional data samples to be used to modulate the carrier signal enabling a greater output sample rate. A data scrambler is also provided to scramble either binary data or data symbols according to the particular mode of communication selected.

3 Claims, 14 Drawing Sheets

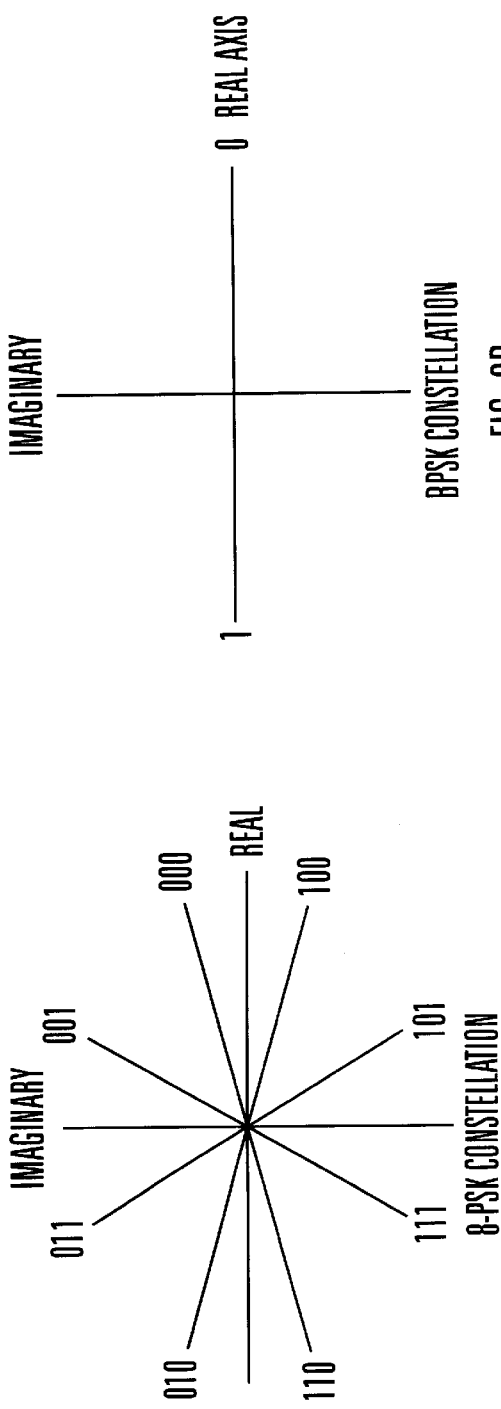
FIG. 2A
PRIOR ART
8-PSK CONSTELLATION
FIG. 2B
PRIOR ART
BPSK CONSTELLATION
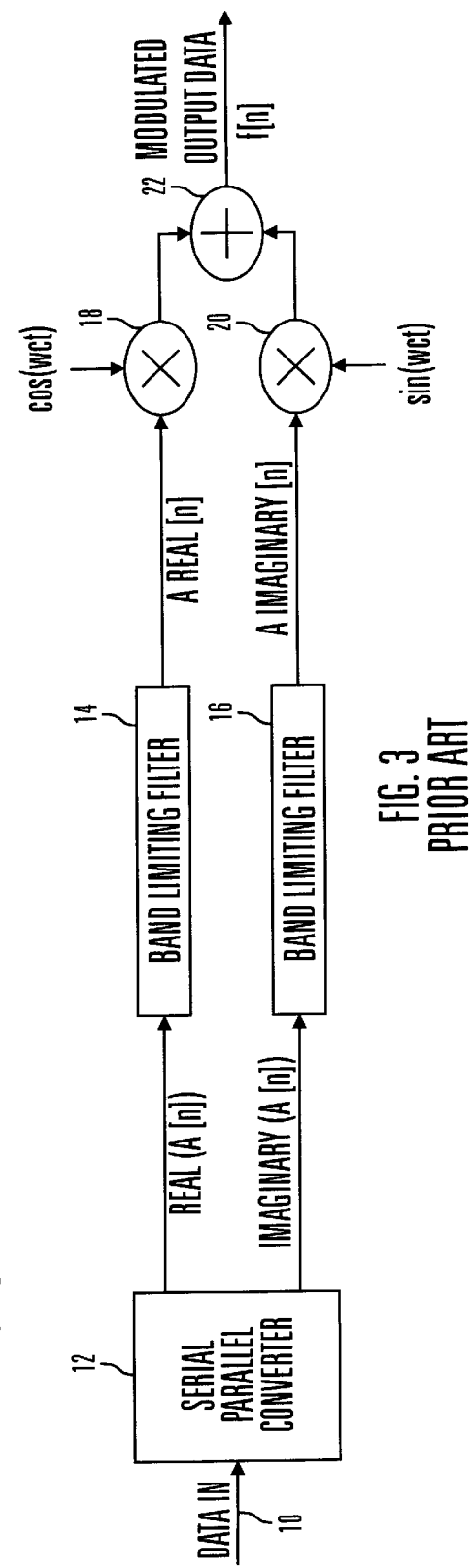
FIG. 3
PRIOR ART

FIG. 13

| BIT | DEFINITION |
|---|---|
| 90 | INVERT DATA BIT 4 |
| 91 | INVERT DATA BIT 5 |
| 92 | INVERT DATA BIT 6 |
| 93 | INVERT DATA BIT 7 |
| 94 | DIGITAL CARRIER BIT 0 |
| 95 | DIGITAL CARRIER BIT 1 |
| 96 | DIGITAL CARRIER BIT 2 |
| 97 | SYMBOL BIT SEL. BIT 0 |
| 98 | SYMBOL BIT SEL. BIT 1 |
| 99 | CLOCK WISE PHASE |
| 100 | WRCK OR WRIN SEL. |

(90-93: 218, 94-96: 220, 97-98: 222)

| BIT | DEFINITION |
|---|---|
| 60 | BIT CLK DATA 0 |
| 61 | BIT CLK DATA 1 |
| 62 | BIT CLK DATA 2 |
| 63 | BIT CLK DATA 3 |
| 64 | BIT CLK DATA 4 |
| 65 | BIT CLK DATA 5 |
| 66 | BIT CLK DATA 6 |
| 67 | BIT CLK DATA 7 |
| 68 | BIT CLK DATA 8 |
| 69 | BIT CLK DATA 9 |
| 70 | BIT CLK DATA 10 |
| 71 | BIT CLK DATA 11 |
| 72 | BIT CLK DATA 12 |
| 73 | BIT CLK DATA 13 |
| 74 | BIT CLK DATA 14 |
| 75 | BIT CLK DATA 15 |
| 76 | BAUD CLK DATA BIT 0 |
| 77 | BAUD CLK DATA BIT 1 |
| 78 | REAL/IMAGE SEL. BIT 0 |
| 79 | REAL/IMAGE SEL. BIT 1 |
| 80 | REAL/IMAGE SEL. BIT 2 |
| 81 | REAL/IMAGE SEL. BIT 3 |
| 82 | REAL/IMAGE SEL. BIT 4 |
| 83 | REAL/IMAGE SEL. BIT 5 |
| 84 | REAL/IMAGE SEL. BIT 6 |
| 85 | REAL/IMAGE SEL. BIT 7 |
| 86 | INVERT DATA BIT 0 |
| 87 | INVERT DATA BIT 1 |
| 88 | INVERT DATA BIT 2 |
| 89 | INVERT DATA BIT 3 |

(60-75: 206, 76-77: 208, 78-85: 216, 86-89: 218)

| BIT | DEFINITION |
|---|---|
| 30 | ADDRESS CNTR BIT 6 |
| 31 | ADDRESS CNTR BIT 7 |
| 32 | ADDRESS CNTR BIT 8 |
| 33 | ADDRESS CNTR BIT 9 |
| 34 | ADDRESS CNTR BIT 10 |
| 35 | ADDRESS CNTR BIT 11 |
| 36 | ADDRESS CNTR BIT 12 |
| 37 | ADDRESS CNTR BIT 13 |
| 38 | SAMPLE CLK DATA BIT 0 |
| 39 | SAMPLE CLK DATA BIT 1 |
| 40 | SAMPLE CLK DATA BIT 2 |
| 41 | SAMPLE CLK DATA BIT 3 |
| 42 | SAMPLE CLK DATA BIT 4 |
| 43 | SAMPLE CLK DATA BIT 5 |
| 44 | SAMPLE CLK DATA BIT 6 |
| 45 | SAMPLE CLK DATA BIT 7 |
| 46 | LOOKUP CLK DATA BIT 0 |
| 47 | LOOKUP CLK DATA BIT 1 |
| 48 | LOOKUP CLK DATA BIT 2 |
| 49 | LOOKUP CLK DATA BIT 3 |
| 50 | LOOKUP CLK DATA BIT 4 |
| 51 | LOOKUP CLK DATA BIT 5 |
| 52 | LOOKUP CLK DATA BIT 6 |
| 53 | LOOKUP CLK DATA BIT 7 |
| 54 | ACCUM. CLK DATA BIT 0 |
| 55 | ACCUM. CLK DATA BIT 1 |
| 56 | ACCUM. CLK DATA BIT 2 |
| 57 | ACCUM. CLK DATA BIT 3 |
| 58 | ACCUM. CLK DATA BIT 4 |
| 59 | ACCUM. CLK DATA BIT 5 |

(30-37: 214, 38-45: 200, 46-53: 202, 54-59: 204)

| BIT | DEFINITION |
|---|---|
| 0 | TEST BIT 0 |
| 1 | TEST BIT 1 |
| 2 | SINGLE PROM |
| 3 | OFFSET SCRAMBLE |
| 4 | MODE ADDRESS BIT |
| 5 | FILTER LENGTH BIT 0 |
| 6 | FILTER LENGTH BIT 1 |
| 7 | FILTER LENGTH BIT 2 |
| 8 | FILTER LENGTH BIT 3 |
| 9 | SCRAMBLER SEED 0 |
| 10 | SCRAMBLER SEED 1 |
| 11 | SCRAMBLER SEED 2 |
| 12 | SCRAMBLER SEED 3 |
| 13 | SCRAMBLER SEED 4 |
| 14 | SCRAMBLER SEED 5 |
| 15 | SCRAMBLER SEED 6 |
| 16 | SCRAMBLER SEED 7 |
| 17 | SCRAMBLER SEED 8 |
| 18 | SCRAMBLER SEED 9 |
| 19 | SCRAMBLER SEED 10 |
| 20 | SCRAMBLER SEED 11 |
| 21 | SCRAMBLER SEED 12 |
| 22 | SCRAMBLER SEED 13 |
| 23 | SCRAMBLER SEED 14 |
| 24 | ADDRESS CNTR BIT 0 |
| 25 | ADDRESS CNTR BIT 1 |
| 26 | ADDRESS CNTR BIT 2 |
| 27 | ADDRESS CNTR BIT 3 |
| 28 | ADDRESS CNTR BIT 4 |
| 29 | ADDRESS CNTR BIT 5 |

(0-1: 224, 2: 225, 3: 226, 4: 227, 5-8: 210, 9-23: 212, 24-29: 214)

SAMPLE INTERPOLATOR AND METHOD OF GENERATING ADDITIONAL SAMPLES OF A SAMPLED WAVEFORM USING A PROGRAMMABLE SAMPLE DIVIDER

CROSS-REFERENCE TO RELATED APPLICATIONS

This is a continuation of application Ser. No. 08/707,029, filed Sep. 10, 1996, now abandoned which is a continuation of application Ser. No. 08/476,692, filed Jun. 7, 1995, now abandoned, which is a division of application Ser. No. 330,577, filed Oct. 27, 1994, now U.S. Pat. No. 5,600,678 which in turn is a continuation of Ser. No. 07/858,397, filed Mar. 26, 1992, U.S. Pat. No. 5,420,887 which is assigned to the same assignee and is incorporated herein by reference.

FIELD OF THE INVENTION

The present invention generally relates to digital communication systems. More particularly the invention relates to communication systems capable of modulating digital data according to operating parameters selected for various applications.

BACKGROUND OF THE INVENTION

Digital communication systems employing bandpass filtered channels typically generate a transmission signal by modulating a carrier signal with digital data prior to transmission. The result of such digital modulation is a time sequence of data samples which are converted by a digital-to-analog converter (DAC) and amplified for transmission.

There are three basic well known techniques for digital modulation, namely, amplitude shift keying (ASK), frequency shift keying (FSK) and phase shift keying (PSK), and numerous variations from these techniques. Waveforms representative of each of these basic techniques are depicted in FIG. 1. It can be seen that each amplitude, frequency or phase in the respective waveforms corresponds to a binary "1" or "0".

It will be understood that if each bit of digital data is used to modulate the carrier signal the amount of data which can be transmitted is limited for a given unit of time. Accordingly, many modulation techniques provide for the transmission of multiple data per unit of time. In more complicated implementations of ASK, FSK and PSK techniques, binary data is grouped, so that a single symbol is assigned to represent a known group of binary data. Each symbol has a corresponding known amplitude, frequency or phase. These more complicated implementations are known as M-ary signaling. For example, in an 8-ary PSK digital modulation scheme, where 8 possible phases are available as symbols, binary data is grouped into sets of 3 bits each. The 8 possible phases can represent 8 possible groups of binary data, e.g., 000, 001, 010, 011, 100, 101, 110, and 111 (see FIG. 2A). Consequently, groups of data are transmitted for a given unit of time.

It is also well known to arrange the possible groups of binary data in a particular digital modulation technique in Gray Code format. The Gray Coding of data groups ensures that only a single-bit differs between consecutive groups. For instance, referring to the 8-ary PSK modulation constellation shown in FIG. 2A, it will be seen that the order of data groups around the constellation is 001, 000, 100, 101, etc. Only one bit differs between each group. Without Gray Coding the symbol order could correspond to the actual numerical sequence, i.e. 000, 001, 010, 011, etc. As is known, the placement of data groups in such Gray Code format reduces the probability of bit error by a decoder following demodulation of the transmitted signal.

As indicated above, the PSK modulation technique symbols can be represented by a phase or modulation constellation. In binary PSK (BPSK) only 2 phases are provided where one phase is designated by a symbol having a bit "0" and the second phase is designated by a symbol having a bit "1". 8-ary PSK and BPSK phase constellations are depicted in FIGS. 2A and 2B respectively. It will be appreciated from FIG. 2 that each symbol can be represented by the complex sequence:

$$x(n) = x_r(n) + x_{im}(n) \qquad (1)$$

where $x_r(n)$ is a real component and $x_{im}(n)$ is an imaginary component of signal x(n). Thus, each symbol may have both real and imaginary components. It will be understood that the real components correspond to in-phase components (I) and the imaginary components correspond to quadrature components (Q) of a composite signal.

A typical implementation of an M-ary PSK system is shown in FIG. 3. Binary input data 10 is received by serial-to-parallel converter 12. The serial-to-parallel converter collects the binary data into groups having $\log_2 M$ bits. It will be recalled that each group is represented by a symbol and that each symbol includes both real and imaginary components. The real component of each symbol is provided to bandlimiting filter 14 and the imaginary component of each symbol is provided to bandlimiting filter 16. The input data rate is represented as $f_b$ and the symbol or baud rate is represented as $f_s$ where $f_s = f_b \log_2/M$. The filtered I and Q components are then modulated by mixers 18 and 20, respectively, and added before transmission by adder 22. The modulated output data indicative of each symbol is then transmitted over a fixed interval defined as the symbol period.

Proper detection of a digitally modulated signal, using the PSK technique, requires that a receiver not be subject to discontinuities in the transmitted signal at the symbol boundaries. For this reason the phase change between transmitted symbols is effected gradually by applying bandlimiting filters 14 and 16 to both in-phase (I) and quadrature (Q) phase components. Bandlimiting filters 14 and 16 provide the required spectral shaping, i.e., gradual phase change, to aid in the detection of the transmitted signal. Consequently, in practice the proper phase or symbol is detected only over a portion of the symbol time rather than over the entire symbol time as depicted in FIG. 1.

Bandlimiting filters 14 and 16 are characterized by an impulse response h(n). It will be appreciated that the filter output y(n) is the convolution of h(n) and the filter input x(n). In the frequency domain the response H(ω) is generally in the form of a bandpass filter. Thus, its time representation after performing an inverse Fourier transform can be represented generally as follows:

$$\sin(\omega_c nt/T)/(\omega_c nt/T).$$

Since h(n) is of infinite duration it must be truncated to a period T' where T' is typically equal to a number of symbol periods, NT. It is also well known in the art to use a window function, W(ω), or w(n) in the time domain, to truncate an impulse response of infinite duration. Therefore, bandlimiting filters can be represented by n impulses over the period T', where each impulse has an amplitude $k_n = h(n) \times w(n)$.

Mixers 18 and 20 which are well known in the art, perform real multiplication of their input signals and produce a desired output together with interharmonic distortion. Thus, carrier frequency and mixer design must be selected so that harmonics produced from the mixer can be eliminated by filtering (not shown in FIG. 3) so as not to distort the transmitted information signal. Often such filters are very complex and costly due to the specifications required to eliminate or reduce interharmonic distortion to an acceptable level.

Intersymbol interference also may distort the transmitted signal. Even though a window can be applied to the bandlimiting filters 14 and 16 to truncate the impulse response, intersymbol interference can still result. Intersymbol interference is caused by selecting a period T' which is greater than the symbol period T. Thus previous symbols contribute to later symbols. For example, if the filter length T' is selected such that T' is 20T, each symbol will have contributions from the last 19 symbols (i.e., 20 symbol periods long). This may be better understood with reference to FIG. 3. The output f(n) is modulated output data and can be defined by the following formula for a sequence of discrete samples derived from the sequence of input symbols x(n):

$$f[n] = \cos(w_c nt/T) * \sum_i x_r(i) k_{n+iS}(i) + j\sin(w_c nt/T) \sum_i x_{im}(i) k_{n+iS}(i). \quad (2)$$

Where S is the number of samples or impulses of the impulse response provided during each symbol period. Thus, the amplitude of the input multiplied by the impulse response for the real and imaginary components are summed for each symbols where they overlap in time which is dependent on the filter length T'.

The results of each stage of the calculation can be seen in FIGS. 4a to 4c. FIG. 4a shows the symbols as output from the serial-to-parallel converter 12 at the baud rate. Note that the output sample rate may be greater than the symbol rate. The output of bandlimiting filter 14 or 16 (i.e., only one component of the complex input is depicted) is shown in FIG. 4b. FIG. 4c, then depicts the modulated signal after the outputs of each symbol have been summed where they overlap in time. For instance, the sum of the amplitudes "X", "Δ" and "☐" shown at a time designated 15 in FIG. 4b would result in the amplitude of the modulated carrier shown at 17 in FIG. 4c.

As previously indicated, mixers 18 and 20 can introduce harmonics which must be removed. Generally such harmonics are removed through the use of baseband transmit filters. Implementing baseband transmit filters has several drawbacks. Depending on the specific design requirements, lumped-element analog filters, probably the most prevalent filter type, often require months of development, empirical design methods, and individual factory tuning and consequently are costly. Analog Finite Impulse Response (FIR) filters have similar restrictions. Digital FIR filters that use multipliers are still relatively expensive, can consume substantial power and are limited to low-speed operation (multiplication cycle times typically greater than 100 ns). Switched capacitor filters, though efficient in terms of both silicon area and power consumption are limited to very low-speed data communications commonly two-kilobaud voiceband modems. Older Binary Transversal Filters (BTFs) that use resistive register networks share many of the same limitations as analog lumped-element and FIR filters, while the newer BTFs or direct-addressing FIR filters can be awkward to fabricate for high-level modulation or alternatively require distinct summing networks.

It has been suggested, [C. A. Siller, Jr. et al., Spectral Shaping and Digital Synthesis of an M-ary Time Series, *IEEE Communications Magazine*, February 1989, pp. 15–24.], that such problems may be overcome by storing in advance the impulse response data, i.e., data representing the output of the filters y(n) for each of the possible M symbols of the modulation filters in a PROM (programmable read only memory) and using an address generator to generate the appropriate address based on the input symbol to create the corresponding sampled output for each symbol. However, such systems have been ineffective in dealing with intersymbol interference. For instance, Siller disclosed generating a number of symbol sequences a priori and computing the outputs based on each sequence to account for the intersymbol interference. Such a system places a heavy burden on memory requirements which grow linearly with the number of samples to be represented in a symbol period T and exponentially with both M, the number of possible symbols, and the filter length NT. Alternatively, such a design limits the number of samples represented during symbol period T, the number of possible symbols M, and the filter length NT, thereby reducing the accuracy of the transmitted signal and reducing the possible modulation schemes.

Furthermore, previous digital modulators have not provided versatility for additional possible modulation schemes. For instance, a new system must be designed each time a parameter is changed (e.g., input bit rate, baud rate, etc.). Likewise, previous digital modulators have not been capable of providing high-speed data rates with accuracy without greatly limiting the complexity of the modulation scheme.

Consequently, a need exists for a digital modulator which overcomes the difficulties of modulators incorporating bandlimited filters and which are versatile enough to accommodate new modulation schemes.

SUMMARY OF THE INVENTION

The present invention overcomes these problems by providing a programmable digital modulator and methods for modulating information according to a broad range of operating parameters.

The programmable digital modulator comprises a data interface for accepting data inputs which in a preferred embodiment are data symbols having known characteristics. A parameter interface is also provided for accepting user defined inputs. The programmable digital modulator further comprises a memory device for storing impulse response data indicative of a sequence of output samples resulting from filtering each data input, an address generator for generating an address of the memory device in response to each data input received from the data interface and in response to the user defined inputs received from the parameter interface; and a data modulator for modulating a signal having a desired carrier frequency with the impulse response data stored in the memory device at the address generated by the address generator.

In a preferred embodiment, the digital modulator further comprises an accumulator coupled to the memory device and the modulator for summing the impulse response data corresponding to a first data input with impulse response data corresponding to at least one previous data input where the impulse response data of each of the inputs is indicative of output samples that overlap in time.

In a further preferred embodiment, the digital modulator also comprises a clock generator for generating timing signals derived from the user defined inputs and a clock signal supplied by a master clock. The timing signals generated provide the input data rate, the address look-up rate used for generating addresses and retrieving impulse response data, and a modulated output sample rate at which the modulated output samples are output from the modulator.

The present invention also provides a novel data modulator which avoids real multiplications and the need for post-modulation filters. The novel data modulator comprises an invertor, and filters in a preferred embodiment, for altering the impulse response data. In a preferred embodiment of the programmable digital modulator, this novel data modulator may be coupled to the memory device. The output samples of the impulse response data are then selectively inverted and selectively attenuated by the novel data modulator means using one or more multiplexers. In this preferred embodiment, the samples are attenuated an amount indicative of the amplitude of the carrier signal measured at predetermined times within one period of the carrier signal.

The present invention additionally provides a novel interpolator for interpolating additional sample values occurring at times between each consecutive accumulated output samples and outputting the additional sample values to the data modulator. In a preferred embodiment, the programmable digital modulator comprises the novel interpolator coupled between the accumulator and the data modulator so that the output sample rate of the data modulator can be increased above the rate at which the samples are accumulated. The novel interpolator determines the difference between two consecutive accumulated output samples and generates an interpolation ratio indicative of this difference divided by the number of additional sample values to be generated. The interpolator further provides an adder to add the interpolation ratio to the last sample value generated thereby generating the next additional sample value.

In a further preferred embodiment, the programmable digital modulator comprises a data scrambler. In this respect the present invention provides a novel scrambler capable of scrambling either binary data or data symbols. The data scrambler is comprised of a pseudo-random sequence (PRBS) generator for generating a PRBS to scramble the input data. The PRBS generator being configurable to output either a single scrambling bit or a number of bits defining a scrambling symbol. The scrambling bit or symbol may then be combined with a bit of input data or an input symbol, respectively, to produce a scrambled output.

In still another preferred embodiment, the programmable digital modulator comprises a differential encoder coupled to the data interface and the address generator for determining a phase difference between phase data corresponding to a first data symbol and phase data corresponding to a second data symbol and providing data indicative of the phase difference to the address generator. The address generator uses the difference data to generate an address of the memory device wherein impulse response data of the phase difference is stored.

In a further preferred embodiment, the data interface, parameter interface, address generator, clock generator, and data modulator are implemented on an integrated circuit chip. The chip is programmable having at least the following input parameters: i) input rate of the data inputs to the data interface; ii) look-up rate indicative of the rate the address generator generates the address of the impulse response data to be output to the data modulator; and iii) modulated output sample rate of the modulated output samples output from the data modulator.

A novel programmable memory device is also provided by the present invention for storing information to be transmitted by the programmable digital modulator according to the present invention. The information to be transmitted represents input data symbols. The data symbols are each to be transmitted for a time defining a symbol period. The novel programmable memory device is coupled to a memory interface for accepting the following inputs: a) transmit filter shape for characterizing an impulse response function; b) number of possible data symbols to be represented by the transmitted information; c) modulation constellation for defining real and imaginary values to each data symbol; d) number of samples per symbol period represented in the impulse response function; and e) the transmit filter length. A processor is also provided for generating impulse response data indicative of output samples resulting from filtering the input symbols with a filter having the specified filter shape and filter length. The programmable memory device has addressable locations for storing the impulse response data generated by the processor. In a preferred embodiment of the programmable memory device, each output sample of the stored impulse response data is stored in sequentially addressable locations.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 2 shows modulation constellations for an 8-ary PSK mode and a BPSK mode.

FIG. 3 is a block diagram of a prior art modulator.

FIG. 4a shows a time sequence of input symbols at a higher output sample rate.

FIG. 4b shows the filtered output samples of the first three symbols shown in FIG. 4a.

FIG. 4c shows the modulated carrier output signal based on the input symbols shown in FIG. 4a.

FIG. 13 shows one implementation of a parameter input table according to the present invention.

DETAILED DESCRIPTION OF THE INVENTION

Figure 5:
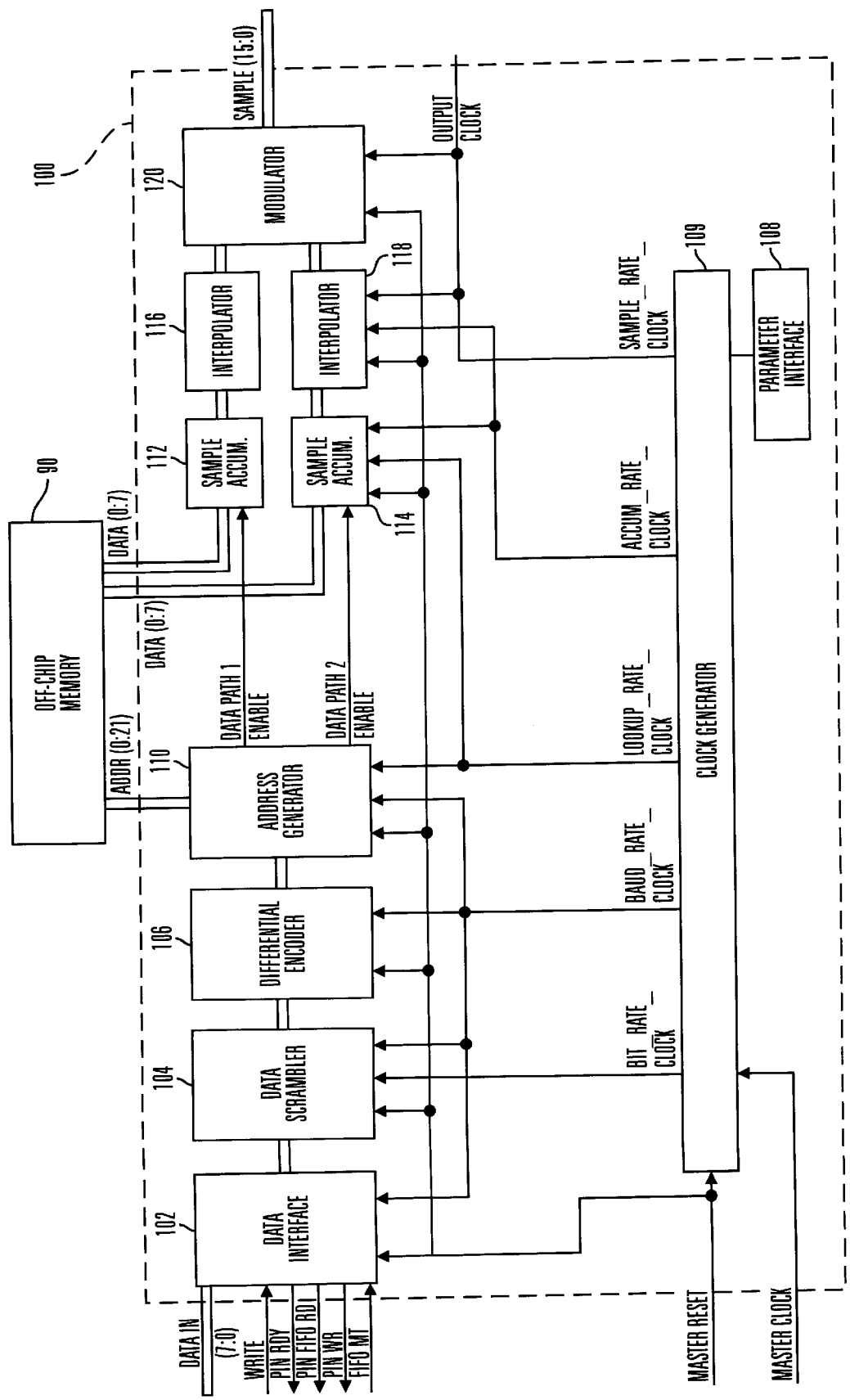
FIG. 5 is a block diagram of a preferred embodiment of the present invention.

Referring to FIG. 5, a preferred embodiment of the present invention is shown. A memory device 90 stores the impulse response data $y_i[n]$ for each input symbol. Such impulse response data is stored in memory 90 before hand in a manner described below. Data interface 102 accepts input symbols and outputs them at the symbol rate $f_s$. In this preferred embodiment a data scrambler 104 is provided to scramble the data to effectively cover the entire transmission bandwidth as is well known in the art. A differential encoder 106 is provided to generate data indicative of the phase difference between the current input symbol and the most previous symbol. The use of a differential encoder 106 to provide a Differential PSK signal (DPSK) alleviates the need for coherent detection for recovering the carrier as is also well known in the art. Although the data scrambler 104 and the differential encoder 106 are depicted in a preferred embodiment they are not required for implementing the present invention. Therefore a detailed discussion of the data scrambler 104 and differential encoder 106 will be deferred.

The address generator 110 uses the input data or differential data in a preferred embodiment, to generate a lookup address of the location where the corresponding impulse response data is stored in the memory device 90. Accumulators 112 and 114, and interpolators 116 and 118 are shown to receive and process data from memory 90. These components will be described in more detail below.

In a simple embodiment of the invention, the impulse response data stored in memory 90 at the address generated by address generator 110 is output to the data modulator 120. The data modulator 120, may for instance comprise a mixer configuration similar to that shown in FIG. 3.

One of the features of the invention is versatility, i.e., adaptability to various situations. To this end a parameter interface 108 accepts user defined inputs specifying, among other things, timing parameters, such as the input data rate to the user interface 102, the symbol transmission rate or baud rate, and the output sample rate of the modulated carrier signal. To implement the user-defined timing parameters, the parameter interface 108 is coupled to clock generator 109. The clock generator 109 receives a master clock signal and divides the clock signal accordingly to provide timing for the data interface 102 at the user-defined baud rate for providing data to the address generator 110, to provide the address generator 110 with a lookup rate for retrieving the impulse response data from the memory device 90, and to provide the data modulator 120 with a timing signal for generating the modulated output samples at the user defined output sample rate. Clock divide circuits are well known in the art to provide such timing signals from a master clock signal. Alternatively, the parameter interface 108 could be implemented as a microprocessor programmed to provide interrupts at the desired intervals to the data interface 102, address generator 110, and to the data modulator 120.

In a preferred embodiment the digital modulator will comprise a two-chip system: the memory device 90 and a modulator chip 100 (see FIG. 5) packaging together at least the parameter interface 108, data interface 102, address generator 110, clock generator 109 and data modulator 120. More preferably, the modulator chip 100 would additionally comprise at least one or more of the following: the data scrambler 104, the differential encoder 106, the real and imaginary accumulators 112 and 114, and the real and imaginary interpolators 116 and 118. Such a system will permit the implementation of substantially all digital modulation schemes over a broad range of operating parameters.

For exemplary purposes, the two-chip system will be described in relation to a so-called in-flight phone system having two channels of operation. One channel called the traffic channel provides an 8-ary PSK mode of communication at 12 Kbps. The second channel called the pilot channel provides a binary PSK (BPSK) mode of communication at 1.2 Kbps. The modulation constellation for the traffic and pilot channels are shown in FIGS. 2A and 2B, respectively. It should be understood that other modulation constellations are possible.

The memory device 90 and the modulator chip 100, may be programmed according to specifications derived for various system applications. The specifications could include, for instance, the transmit filter shape, the modulation constellation, the number of bits per symbol, the transmit filter length, the carrier frequency, and the number of output samples per carrier period. Given a set of specifications, the impulse response data for each symbol represented in the desired modulation constellation could be generated and stored in the memory device 90.

Figure 1:
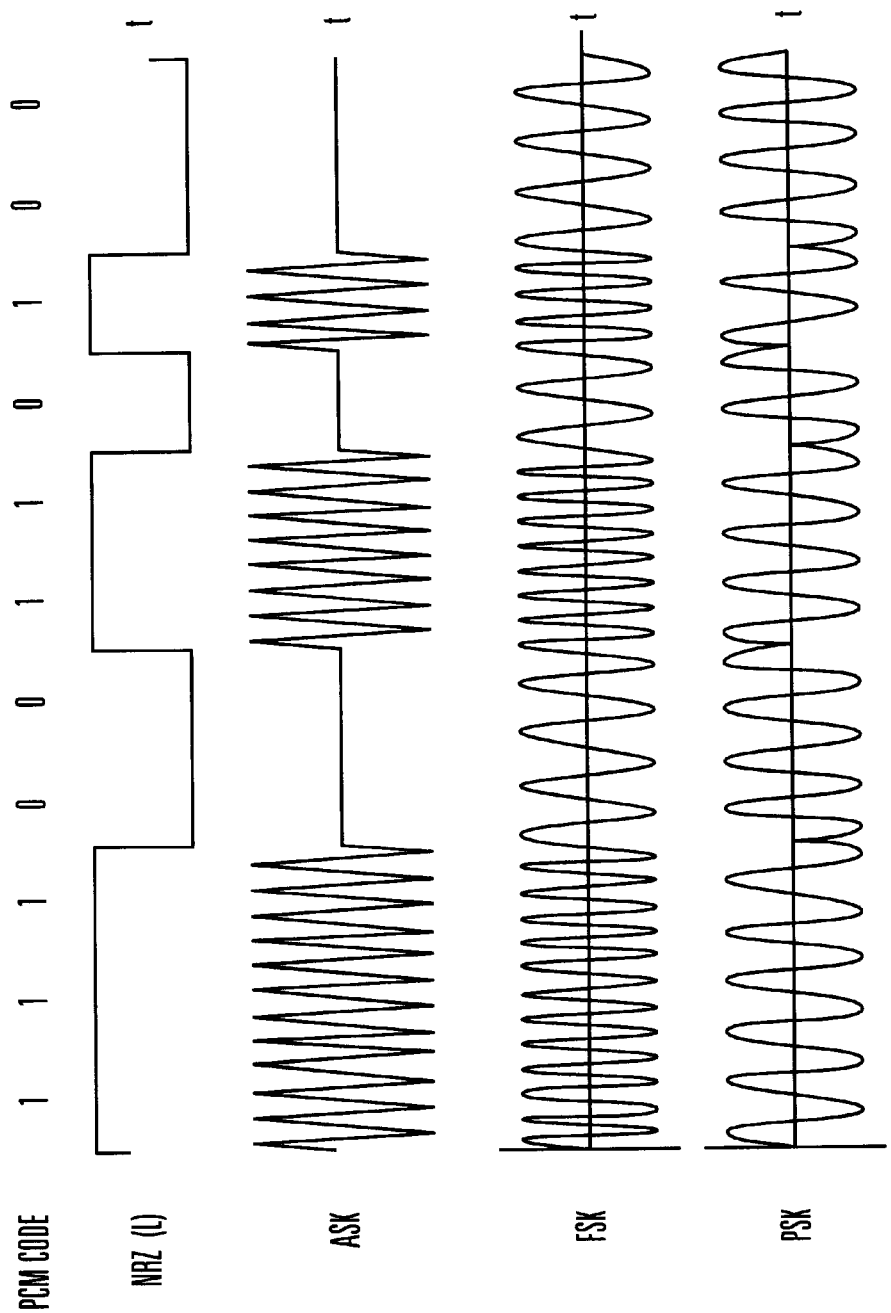
FIG. 1 shows the transmitted signals according to three digital modulation schemes.
Figure 4:
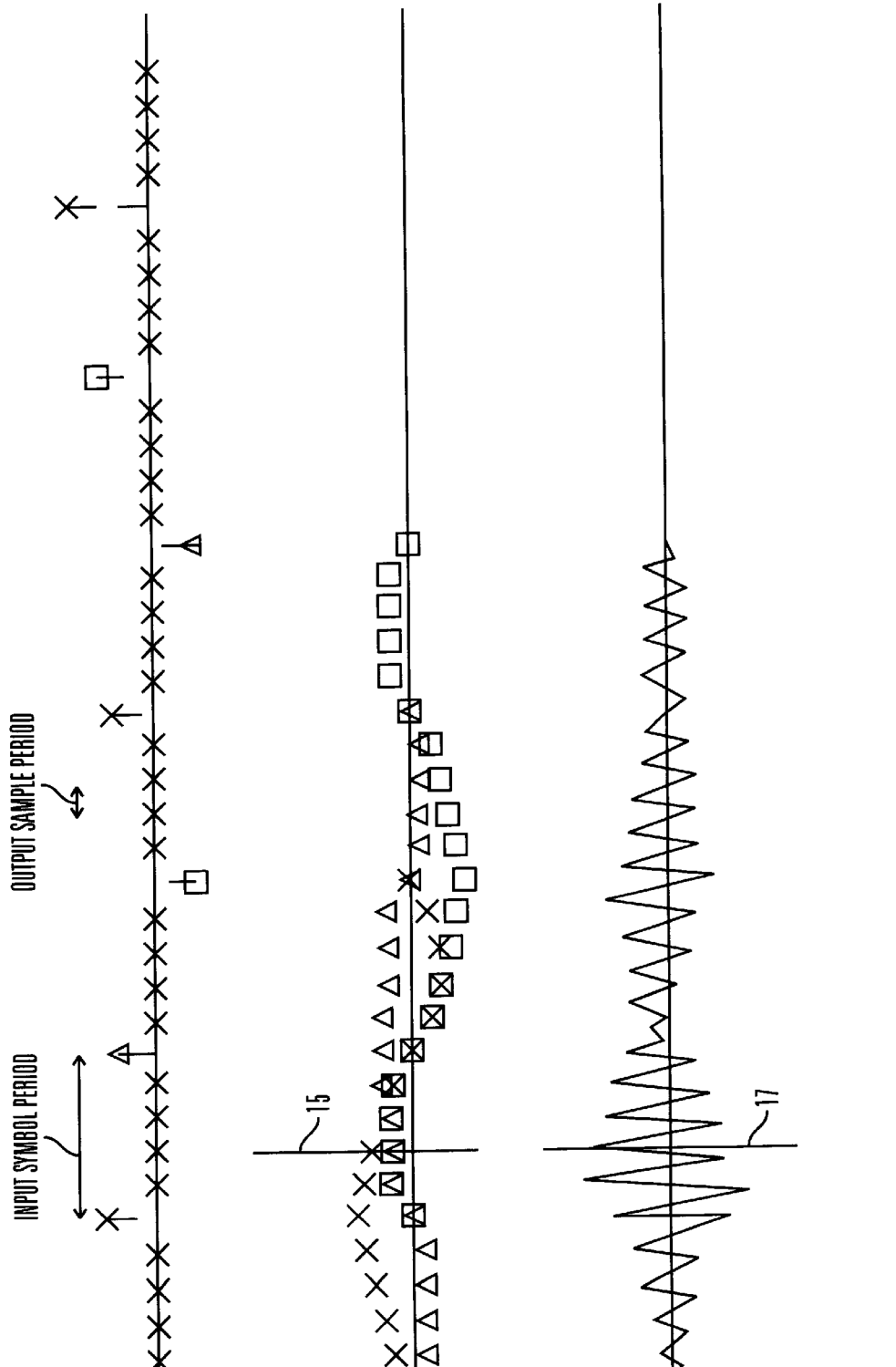

For instance, in the in-flight phone system, the transmit filter shape is preferably a root-raised cosine filter truncated by a Kaiser window. The filter length specified will become the number of symbol periods over which the filter response must be stored. The filter length should be long enough to cover substantially all significant symbol energy. Functionally, a user would utilize a data processor to generate the desired impulse response data and thereafter burn this data into a PROM. For instance, in the traffic channel, the time samples indicative of the truncated impulse response are attenuated by the value assigned to each symbol according to the modulation constellation. Referring to FIG. 4b, the impulse response is shown to be 4 symbol periods in length, where each symbol period will provide 5 impulse samples. FIG. 4a represents the real values associated with a random sequence of input symbols (i.e. symbol "X" has a value of 1 derived from $\cos(0°)$, symbol "Δ" has a value of 0.5 derived from the $\cos(60°)$, and symbol "□" has a value of −1 derived by the $\cos(180°)$). One can readily see the scaled impulse response data shown in FIG. 4b representing each of these symbols after filtering. In other words, symbol "X" has a real value $X_r(i)=1$, symbol "Δ" has a real value $x_r(i)=0.5$, and symbol "□" has a real value $X_r(i)=-1$. The impulse response of the filter $k_n=h(n) \times w(n)$ is multiplied by each $x_r(i)$ to form the impulse response data corresponding to each of the symbols $y_i(n)$. Therefore, 2×M (M real and M imaginary) scaled impulse response data sets are generated and burned into the PROM using well known techniques.

Figure 6:
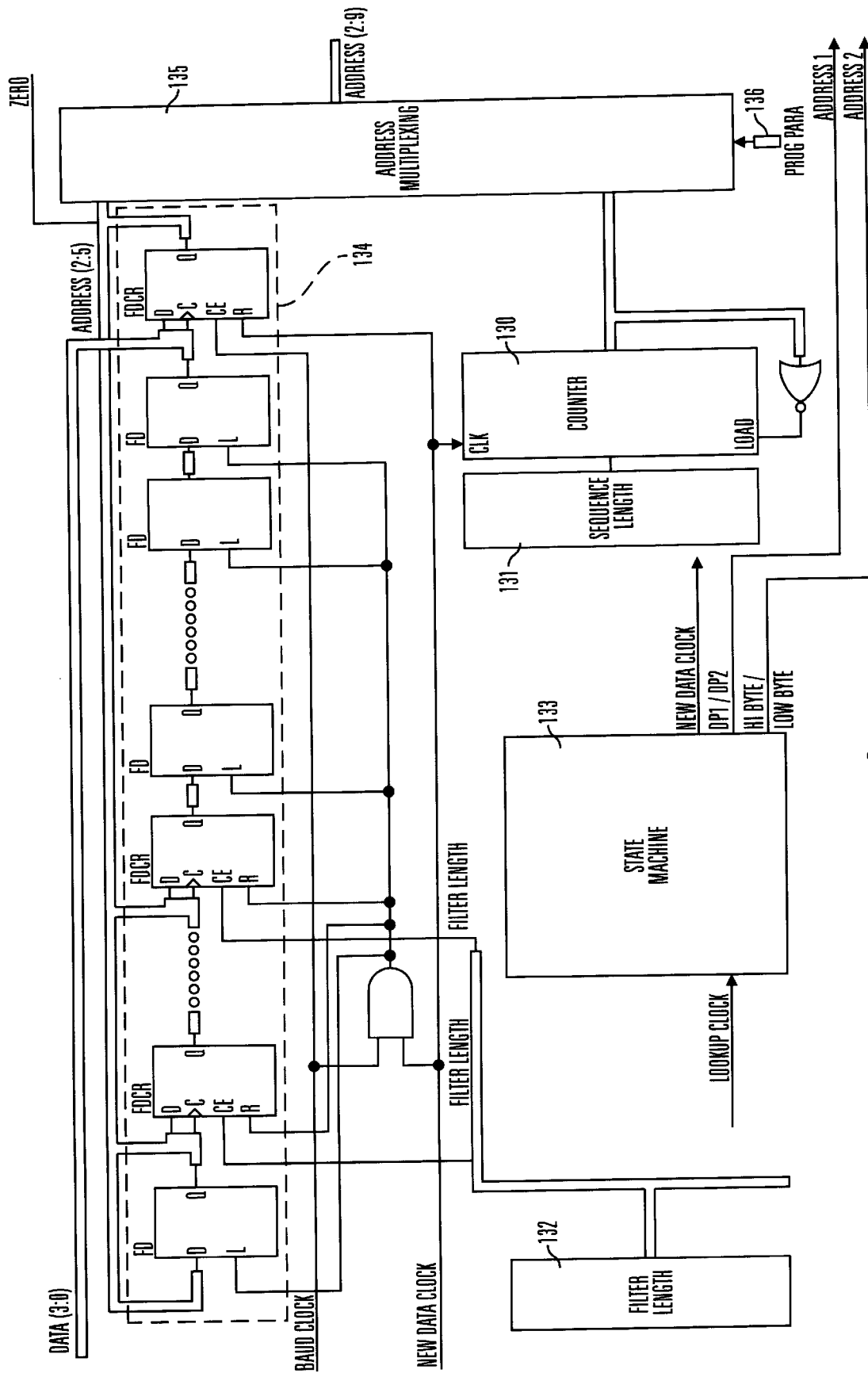
FIG. 6 is a detailed block diagram of an address generator according to the present invention.

One implementation of address generator 110 is shown in FIG. 6. The filter length, a user-defined input, is output from the parameter interface 108 to a filter length circuit 132 of the address generator 110. Shift registers 134 may comprise a plurality of D-type flip-flops forming a circular buffer. The number of flip flops used will be determined by the filter length circuit 132 indicating how many symbols must be stored in order to accumulate all necessary samples, i.e., this is the number of symbol periods NT defining the filter length. In other words, in an 8-ary PSK mode using a filter length of 20 symbols, 20 3-bit symbols must be stored in the shift registers 134.

The shift registers 134 must be shifted 20 (or whatever number N has been selected) times per sample time to generate the address of each of the 20 symbol's contributions to a given sample. Since each symbol is also represented by a predetermined number of samples, S, per symbol period the shift registers 134 must be shifted a total of S×N times (this is the number of output samples stored for each set of impulse response data). Counter 130 counts out the S×N shifts of shift register 134 at the symbol rate multiplied by the number of samples per symbol, (i.e., $f_s \times S$). This number is derived from the user-defined inputs and provided by the parameter interface 108 to the address generator 110 via the sequence length circuit 131. The sequence length circuit 131 provides the counter 130 the value S×N for which the counter 130 must count shifts of the shift register 134.

Memory device 90 is implemented as a PROM, addressable with a 20-bit address. A preferred bit definition of the address bus for each of four PSK modes is shown in Table 1.

TABLE 1

| Address Bit | SELECT | | | |
|---|---|---|---|---|
| | 1 | 2 | 3 | 4 |
| 20 | Mode | Mode | Mode | Mode* |
| 19 | 0 | 0 | 0 | C13 |
| 18 | 0 | 0 | C13 | C12** |
| 17 | 0 | C13 | C12 | C11 |
| 16 | C13 | C12 | C11 | C10 |
| 15 | C12 | C11 | C10 | C9 |
| 14 | C11 | C10 | C9 | C8 |
| 13 | C10 | C9 | C8 | C7 |
| 12 | C9 | C8 | C7 | C6 |
| 11 | C8 | C7 | C6 | C5 |
| 10 | C7 | C6 | C5 | C4 |
| 9 | C6 | C5 | C4 | C3 |
| 8 | C5 | C4 | C3 | C2 |
| 7 | C4 | C3 | C2 | C1 |
| 6 | C3 | C2 | C1 | C0 |
| 5 | C2 | C1 | C0 | S3*** |
| 4 | C1 | C0 | S2 | S2 |
| 3 | C0 | S1 | S1 | S1 |
| 2 | S0 | S0 | S0 | S0 |
| 1 | RI | RI | RI | RI |
| 0 | HL | HL | HL | HL |

*Mode: Mode Bit (Chip Configuration)
**CN: Address Counter Bit n
***Sn: Symbol Bit n
****RI: Real/Imaginary Bit
***** HL: High/Low Bit Note that unused high order bits will be set low.

Since PROMs typically have an 8-bit input/output bus and the output sample data stored in the PROM is 16 bits long, the address generator 110 must access 2 separate bytes, referred to as the high byte and the low byte. Thus the "0" bit designates whether the address corresponds to the high or low address byte. The real/imaginary bit, "1", designates the real or imaginary data path. The symbol bits "2" to "5", depending on the number of symbols M used, provide the symbol output from shift register 134 resulting from each shift. Address bits "3" to "20", again depending upon the possible number of symbols M, contain the count supplied by the counter 130. In modes using less than the full 20 bits of the address, zeros can be used to fill in the extra address bits "17" to "19" as necessary.

State machine 133 allows the hi/low byte signal to be sequenced as well as enabling the two data accumulation paths, one for the real data and one for the imaginary data. In this manner, the real or in-phase output samples of each input symbol are output to accumulator 112 and the imaginary or quadrature output samples of each symbol are output to accumulator 114. The state machine 133 also sets bits "0" and "1" of the address designating real or imaginary data as well as the high or low bite as appropriate. It will be appreciated that an understanding of how data is to be retrieved is necessary to store data at the proper address location.

The address multiplexer 135 combines symbol bits from the shift registers 134 with a count supplied by the counter 130 and outputs these bits along with a mode bit "20" and padded bits as necessary to the memory 90. The mode bit is provided by a user-defined input to the parameter interface 108 which is then stored by the parameter interface 108 in the program parameter circuit 136. The mode bit is supplied from the program parameter circuit 136 to the address multiplexer 135 each time an address is to be generated. Based on the value of the mode it stored in the program parameter circuit 136, the address multiplexer 133 can establish how many symbol bits to retrieve from the shift registers 134 and how many padding bits will be required. It should be understood that the number of mode bits depends upon the number of modes to be provided by the digital modulator, e.g. if four modes are provided then at least 2 mode bits are necessary.

The count bits C0 through C13 are output to the address multiplexer 135 at the rate $f_s$. The address multiplexer 135 will output the combined address of count bits, symbol bits, mode bit and padding bits at the lookup rate.

Figure 7:
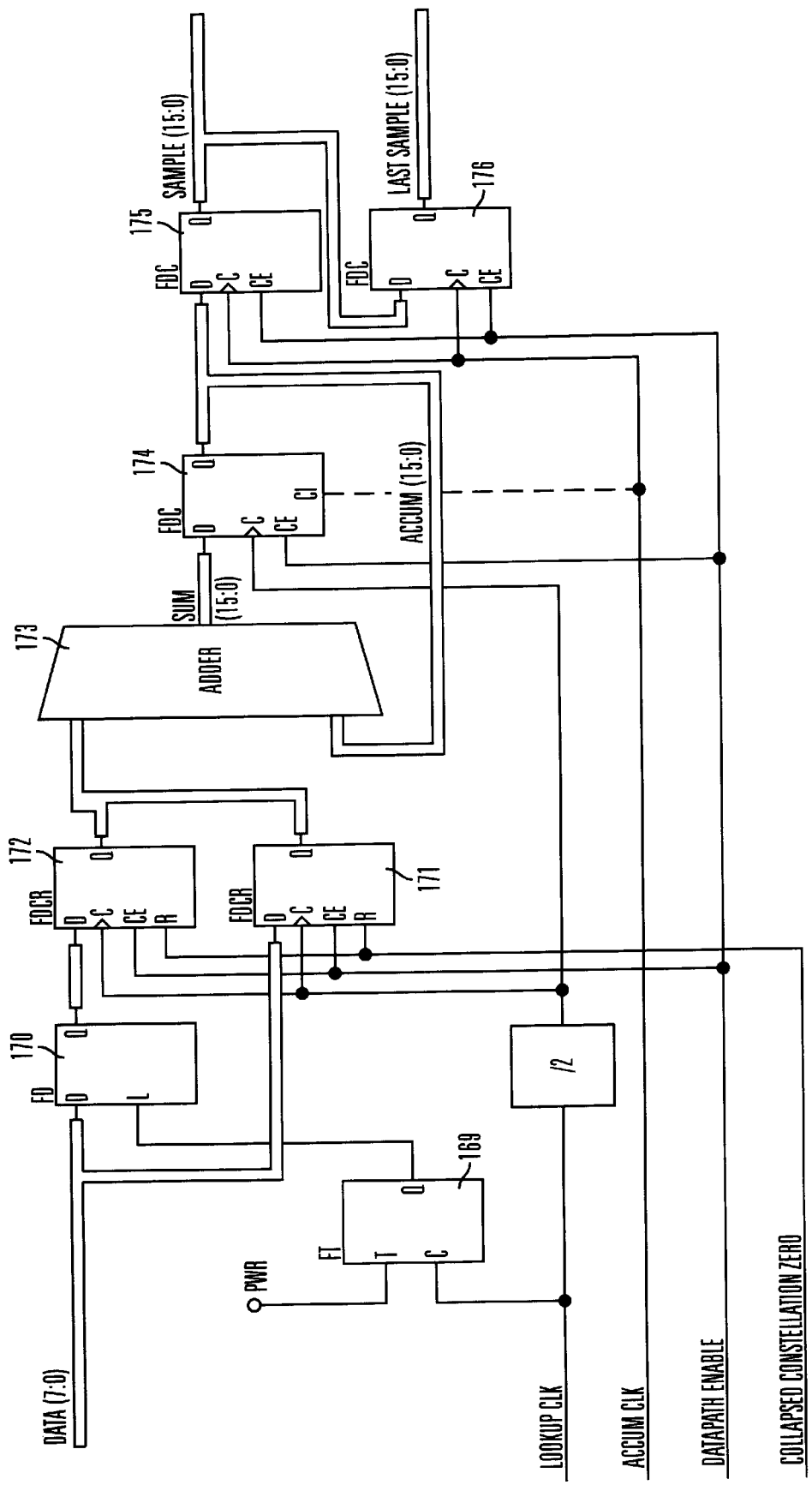
FIG. 7 is a detailed block diagram of a sample accumulator according to the present invention.

A block diagram of accumulator 112 or 114 is shown in FIG. 7. The output samples from the memory device 90 are input to the accumulators 112 and 114, depending on the data path selected by the address generator 110. Each output sample is stored in registers 171 and 172. Latches 169 and 170 are used to synchronize the high and low bytes representing each output sample which is input to the adder 173. Thus the high byte is stored in latch 170. When the low byte is input to accumulator 112 or 114 the high byte is output and stored in register 172 and the low byte is stored in register 171. The frequency of the lookup_clock signal is increased by a factor of 2 which is then used to provide the output sample as an input to the adder 173. Adder 173 adds each output sample provided by registers 171 and 172 with an accumulated output sample generated by the adder 173 at the last lookup_clock pulse or interrupt. Register 174 stores the running sum of each accumulated output sample and feeds this value back to adder 173. When N (corresponding to the number of symbols periods defining the filter length) output samples have been accumulated, the accumulated output sample is transmitted from register 174 to register 175 and register 174 is cleared. Each current accumulated output sample is provided by register 175 as an input to data modulator 120.

The most current accumulated output sample is stored in current sample register 175 until the next accumulated output sample has been computed. The next accumulated output sample value replaces the accumulated output sample stored in current sample register 175. In a preferred embodiment, the desired output sample rate may be greater than the lookup rate used by the accumulators 112 or 114 to retrieve each of the stored output samples. Therefore, interpolators 116 and 118 are used in a preferred embodiment to provide additional sample values between two consecutive accumulated output samples. For this reason, when the current accumulated output sample is replaced with a new accumulated sample the former is stored in the last sample register 176 of accumulator 112 or 114.

Figure 8A:
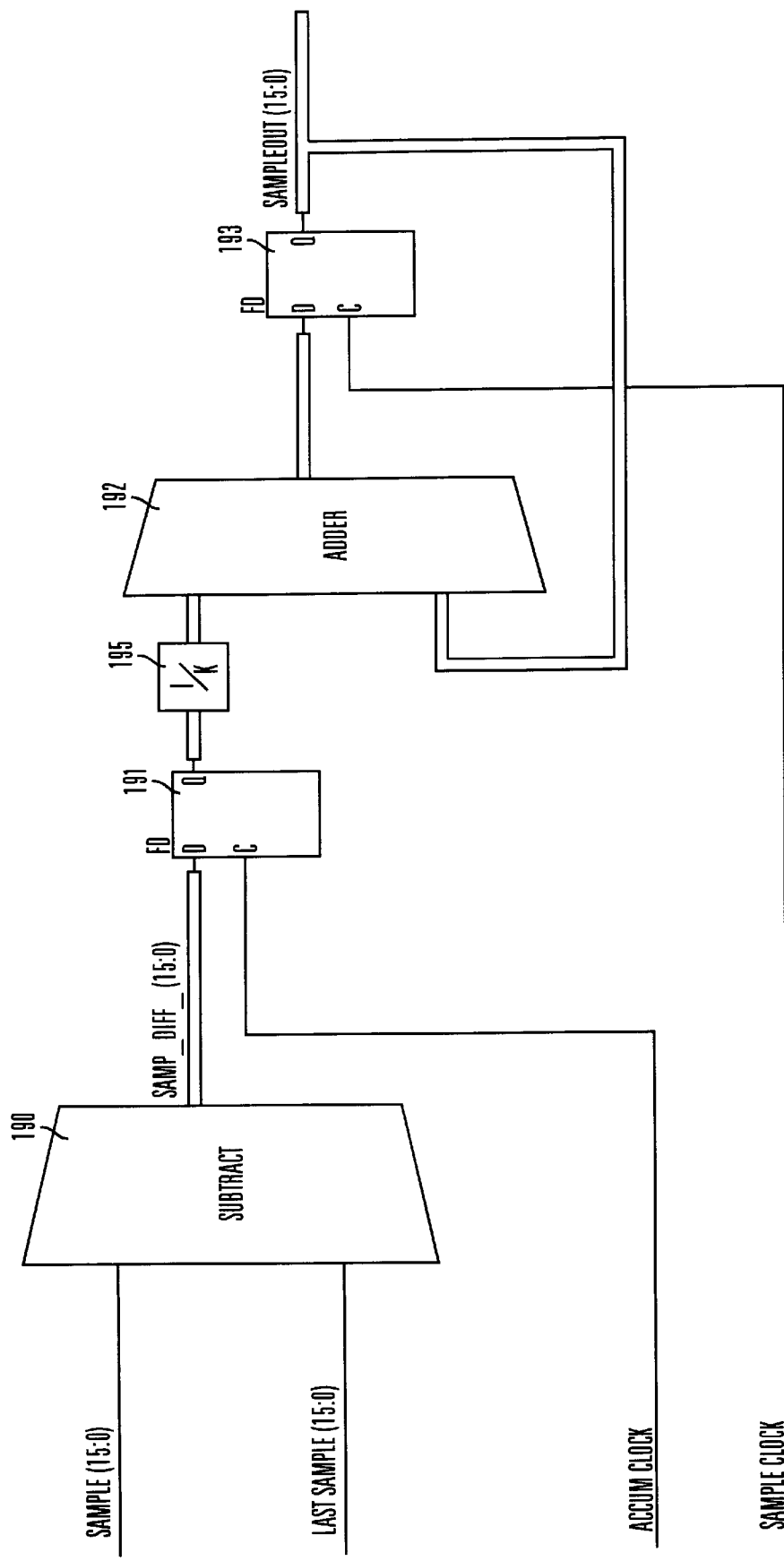
FIGS. 8A and 8B are a detailed block diagram of a sample interpolator according to the present invention.
Figure 8B:
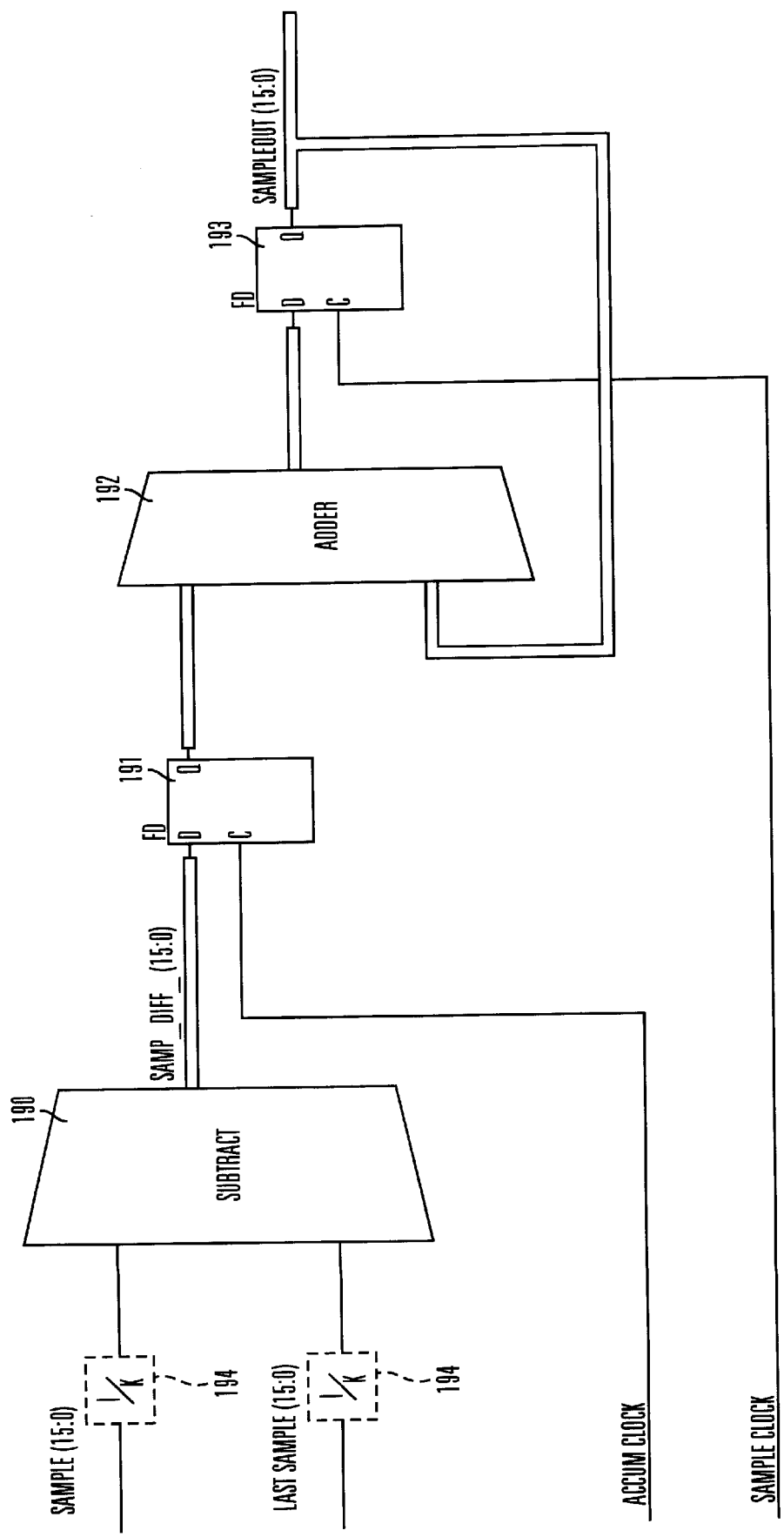

A detailed block diagram of an interpolator 116 or 118 is shown in FIGS. 8A and 8B. If the output sampling rate is very large as compared to the bandwidth of the bandlimited output, y[n], the amount the samples will change between any two consecutive samples is relatively small. For this reason, when the rate at which output samples are required exceeds the rate at which an accumulator 112 or 114 can produce them through the previous look-up technique, additional samples can be generated through interpolation. A recursive definition of the output samples based on the current accumulated sample $A_i$ and the subsequent accumulated output sample $A_{i+1}$, can be provided as follows:

$$I_k = A_i \ (k/K) + A_{i+1} \ [(K-k)/K]. \tag{3}$$

Simplifying this equation, $$I_{k+1} = I_k + [(A_{i+1} - A_i)/K]. \tag{4}$$

Where $I_k$ is the last additional output sample derived by interpolation and K is the number of additional samples to be interpolated between any two consecutive accumulated output samples. The ratio $[(A_{i-1} - A_i)/K]$ is the interpolation ratio. The scaling factor K is a value which can easily be stored in the lookup table data. It should be noted that interpolation introduces an additional source of error in the transmitted signal. Techniques of estimating interpolation errors are well known in the art.

Referring to FIGS. 8A and 8B, the current accumulated output sample from the current sample register 175 and the previous accumulated output sample from the last sample register 176 are input to subtractor 190 of interpolator 116 or 118. Subtractor 190 performs the operation $A_{i+1}$, minus $A_i$ resulting in an accumulated sample difference which is output to an adder 192 via latch 191. Latch 191 provides the accumulated sample difference at the accumulator clock rate. Adder 192 adds the previous interpolated output sample $I_k$ with the accumulated sample difference divided by the scaling factor, according to the above equation. Latch 193, outputs the interpolated output sample to both the data modulator 120 and the adder 192 at the output sample rate.

One way of implementing the interpolator in accordance with equations (3) and (4) above would be to provide a divide by K circuit 195 as shown in FIG. 8A. It should be understood that the use of the divide by K circuit 195 comports to equation (4) above. Alternatively, as suggested above, the impulse response data could be divided by a value "K" before the data is stored in the PROM, i.e. the look-up table. If the latter method was used each accumulated sample would be reduced by a factor of K as shown by the dashed boxes at 194 in FIG. 8B. This latter method comports more closely with equation (3) above. Although, theoretically, equations (3) and (4) are equivalent, it should be understood that some differences may exist due to quantization errors. It should be further understood that other methods of dividing by the scaling factor according to equations (3) and (4) are also possible.

Figure 9:
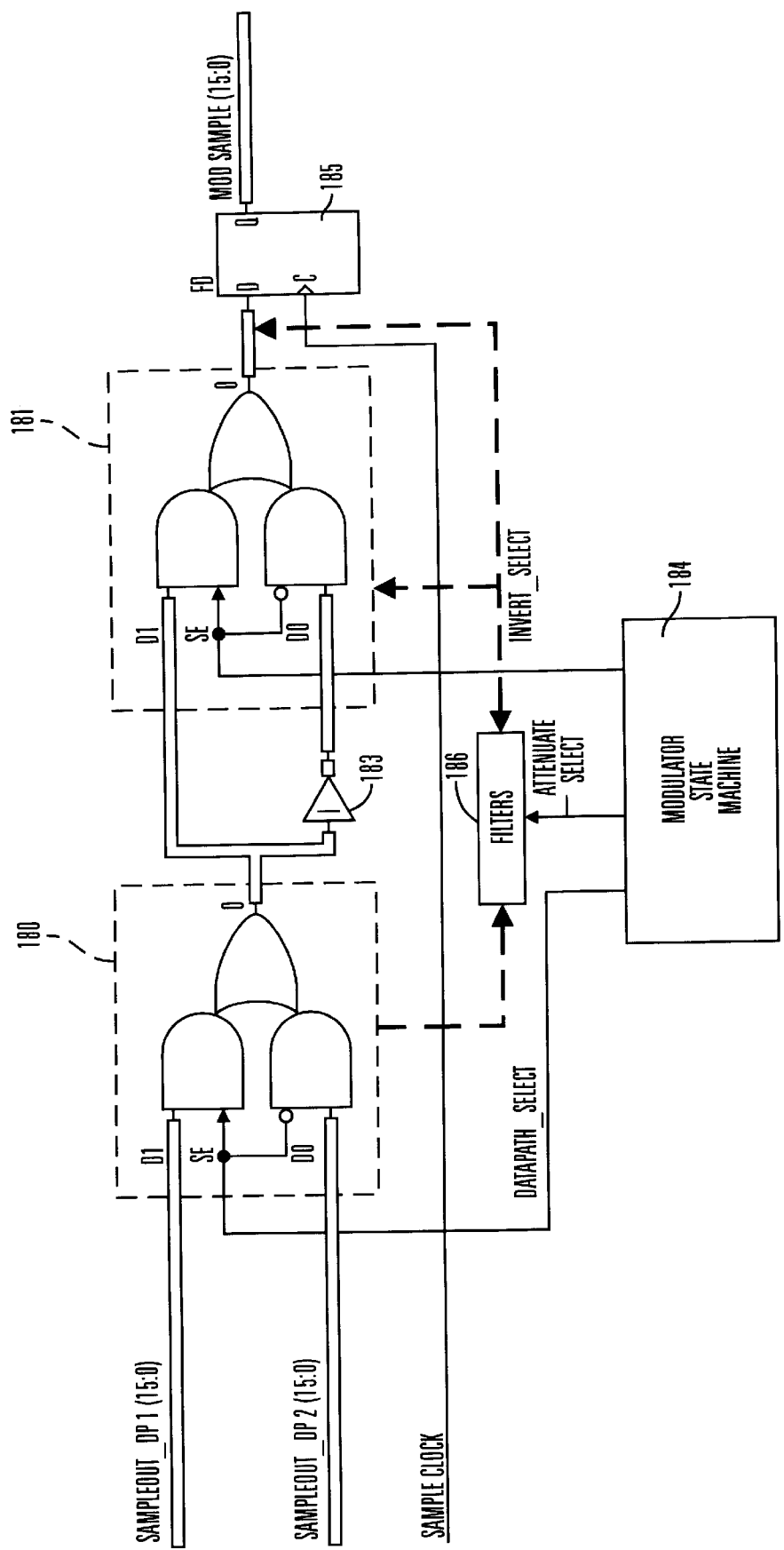
FIG. 9 is a detailed block diagram of a data modulator according to the present invention.

Data modulator 120 may comprise the standard mixer configuration shown in FIG. 3 for modulating a carrier signal. However, in a preferred embodiment shown in FIG. 9, the modulator may comprise multiplexers 180 and 181 and an inverter 183, which are controllable by the modulator state machine 184. This implementation takes advantage of various characteristics of the modulation function in order to simplify the hardware needed for its realization. The output sampling rate can be chosen to use particularly convenient values of the sine and cosine functions of the carrier.

For example, if the carrier is sampled at 4 times the carrier frequency, the output can be sampled at the points, $0, \pi/2, \pi, 3\pi/2$. At these points, the sine and cosine functions have an amplitude of either −1, 0, or 1 and allow for implementation without a real multiplication (Compare the modulator in FIG. 3 which requires real multiplication). Thus, the modulator state machine 184, alternately selects the real and imaginary data paths (Note from FIG. 2 BPSK has no imaginary path) via multiplexer 180 and selectively inverts the modulated output sample accordingly (e.g., 1*I, 1*Q, −1*I, −1*Q . . . ).

Where the output sampling rate is greater than 4 times the carrier frequency, filters 186 may be coupled to the output of multiplexer 181 or alternatively coupled between multiplexers 180 and 181 (possible placement of filters 186 shown as dashed lines in FIG. 9), and selected by the state machine 184 for attenuating some of the accumulated output samples to form a modulated output sample. For instance, to sample the carrier at 6 times the carrier frequency, the cosine terms of the real data path take on the values 1, 0.5, −0.5, 1, −0.5, and 0.5. Thus a filter having a passband amplitude of 0.5 may be placed in the data modulator 120 coupled to multiplexer 181. Using the 6-samples/carrier period example, the state machine 184 will select the filter so that the 2nd, 3rd, 5th and 6th accumulated output samples are attenuated by a factor of 0.5. The modulated output samples are latched out of the data modulator 120 via latch 185 at the modulated output sample rate.

Figure 10A:
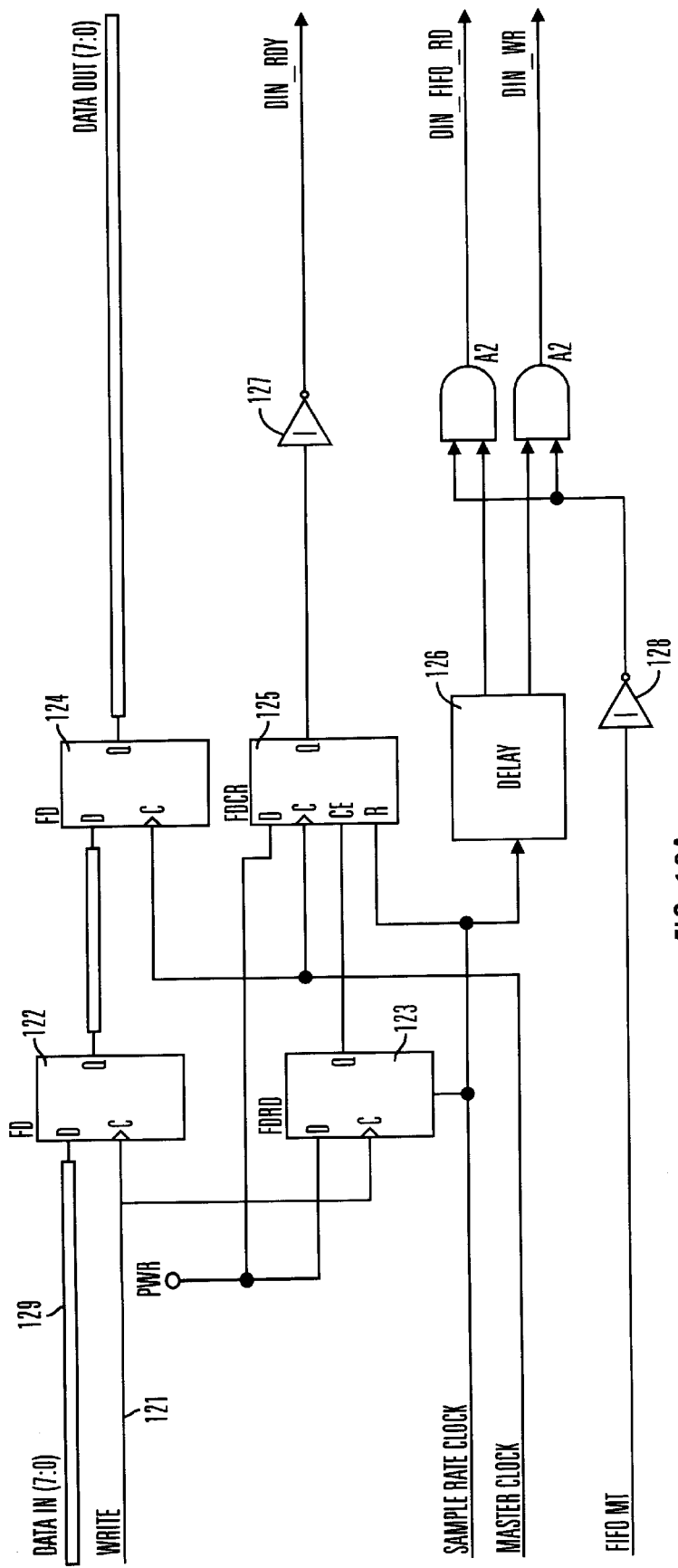
FIG. 10a is a detailed block diagram of a data interface according to the present invention.
Figure 10B:
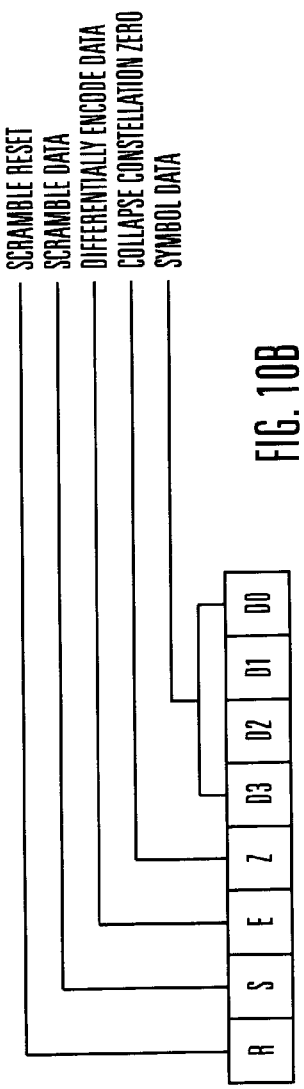
FIG. 10b is the signal definition of the data input to the data interface.

A block diagram of one possible implementation of the data interface 102 is shown in FIG. 10a. In this implementation, the data interface 102 is designed as a simple bus interface that is written to by the rising edge of write strobe 121. The definition of the data bits 129 are shown in FIG. 10b. The interface is typically operated by writing a new data symbol at the system baud rate as determined by the user defined inputs. Latches 122 and 123 are used to latch data into the chip at the bit rate and synchronize the data to the internal time base, i.e. baud rate. Data is latched out of the data interface 110, synchronized with the master clock by latch 124. An additional register 125 stores the data for output to an off-chip FIFO and delay circuit 126 and inverters 127 and 128 are provided for interface signaling with the FIFO.

Figure 11:
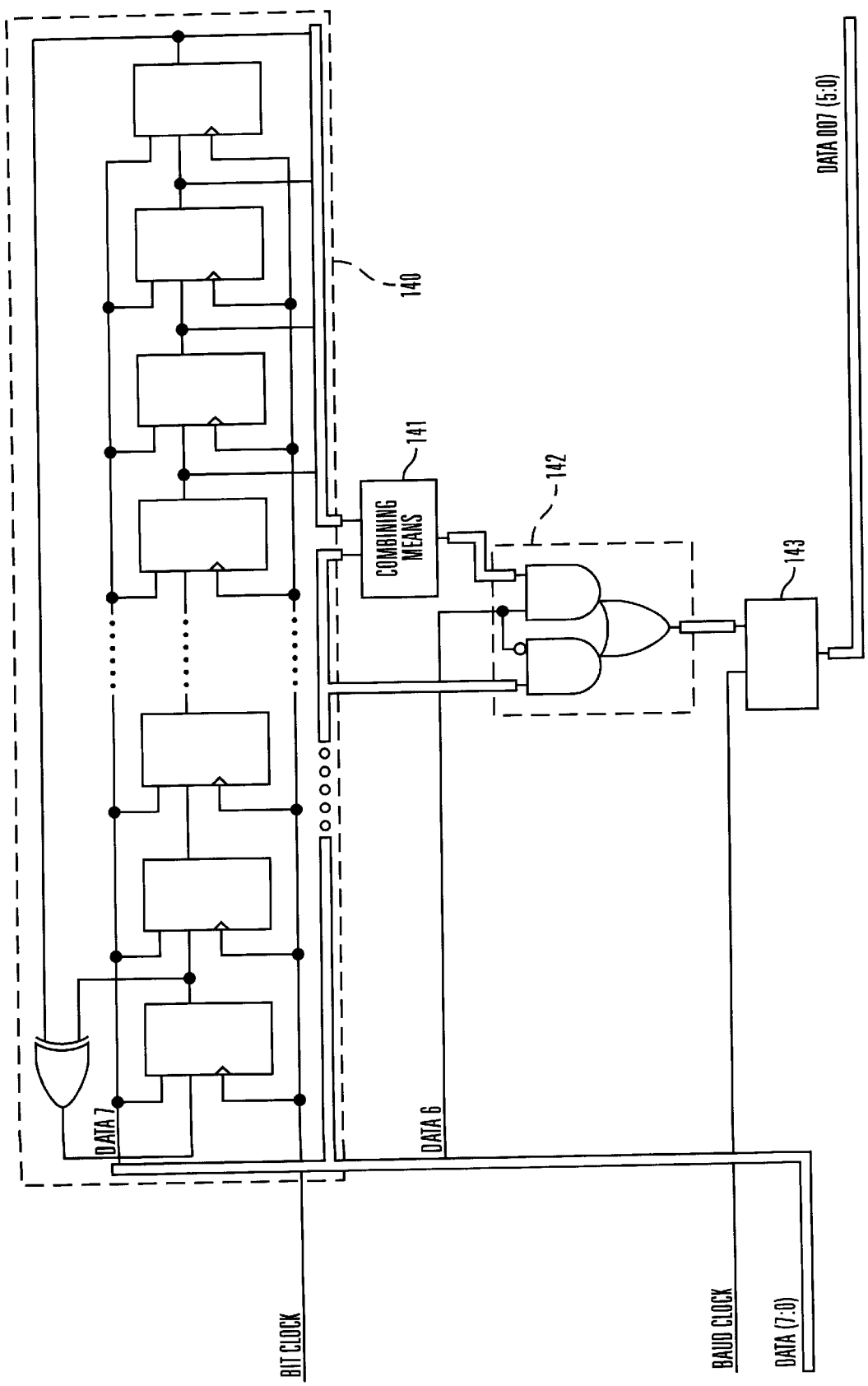
FIG. 11 is a detailed block diagram of a data scrambler according to the present invention.

As discussed previously, in a preferred embodiment a data scrambler 104 may be included as shown in FIG. 5. A detailed block diagram of one possible implementation of data scrambler 104 is shown in FIG. 11. The scrambler 140 is a pseudo random sequence generator and in this example is an implementation of the polynomial $1+X+^{15}$, which can be loaded with any seed vector. For the In-Flight Phone system, the seed vector is "110 1001 0101 1001" (Most Significant Bit to Least Significant Bit). This pseudo-random binary sequence (PRBS) can be restarted under user control by accompanying any data symbol with a scramble reset command on the 8-bit parallel interface bus. This command will have the effect of starting the PRBS at the least significant bit of the symbol.

Three modes of operation are possible with the data scrambler 104, i.e., bit scrambling, phase scrambling, and no-scrambling. To selectively randomize each of the input symbols, bit 6 of the parallel interface bus can be set accordingly, for example as designated in FIG. 10b. To bit scramble, the PRBS generator 140 is advanced one bit per clock of the bit_clock signal (i.e., the bit_clock rate is the user defined baud rate divided by the number of bits/symbol (or $\log_2 M$)). As the PRBS generator 140 advances the least significant bits are output to the exclusive-OR 141 to scramble each bit of the current input symbol. Alternatively, the input symbols may be scrambled in-phase by outputting a number of bits from the PRBS generator 140 equal to the number of bits/symbol at the baud rate. Multiplexer 142 is used to select either the scrambled data from the combining means 141 or the data input from the data interface 102. It should be understood that the combining means could be implemented as an exclusive-OR gate for bit scrambling and as a binary adder for phase scrambling. Latch 143 outputs the selected data synchronized with the baud_clock signal.

Figure 12:
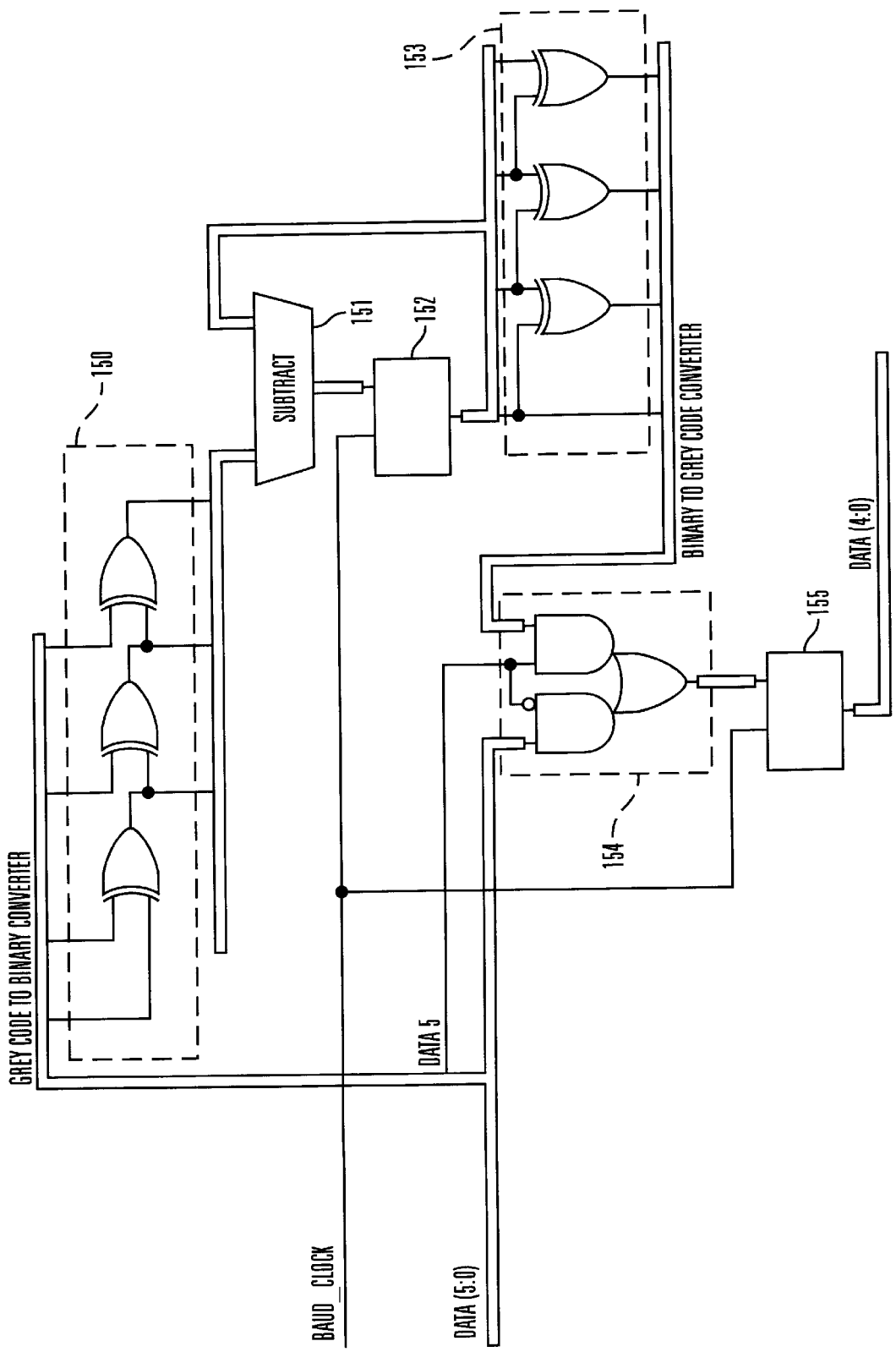
FIG. 12 is a detailed block diagram of a differential encoder according to the present invention.

A block diagram of the differential encoder 106 is shown in FIG. 12. To extract the differential phase from the last symbol, a subtraction in Gray Code is performed. It should be noted that although it is preferable to use a Gray coded signal as explained previously, it is not required by the invention. However, if Gray coding is used Gray Code-to-Binary converter 150 converts each Gray coded symbol input to the differential encoder 106 to its binary equivalent. It should be understood that if phase scrambling as described above is to be used, the Gray Code-to-Binary conversion would preferably be carried out on the symbol data prior to its input to combining means 141 in FIG. 11. Subtractor 151 performs a binary subtract operation of the binary equivalent of the most current symbol and the most previous symbol. The binary difference is output to a latch 152 which provides the difference to the Binary-to-Gray code converter 153 at the baud rate. Thus, the subtraction is in effect carried out in Gray Code although performed in binary. Multiplexer 154 selects the difference symbol output from the binary-to-Gray Code convertor 153 or the symbols output from the data scrambler 104 depending upon bit 7 of the input data byte. The output of the multiplexer 150 is latched out of the differential encoder 106 to the address generator 110 via latch 155 at the baud rate, $f_s$.

One possible implementation of the parameter interface 108 will now be described with reference to FIG. 13. A parameter input table is shown in FIG. 13. The parameter input table may be implemented using a shift register comprising D-type flip flops. As indicated in FIG. 13, each of the user defined inputs must be placed in the table by the user. Referring to Table 2, the In-Flight Phone system channel timing characteristics and divide ratios from a master clock having a frequency of 21.84 MHz are listed.

TABLE 2

|  | IFPC Modulation Clock Rate | | Clock Divide Parameters from 21.84 MHz | |
| --- | --- | --- | --- | --- |
|  | 8-ary PSK | BPSK | 8-ary PSK | BPSK |
| Bit Rate | 12 KHz | 1.2 KHz | 1820 | 18200 |
| Baud Rate | 4 KHz | 1.2 KHz | 3 | 1 |
| Lookup Rate | 7.28 MHz | 5.46 MHz | 3 | 4 |
| Accum Rate | 140 KHz | 109.2 KHz | 156 | 200 |
| Sample Rate | 1.82 MHz | 2.73 MHz | 12 | 8 |

The clock divide parameters are entered into the parameter table in binary form. For instance the sample clock ratio for the 8-ary PSK channel would be entered into Bits 38–45, designated generally as 200, as the binary number "00001100" which represents the decimal number "12". Similarly, the lookup ratio would be entered at 202 as "00000011", the accumulation clock ratio would be entered at 204 as 010011100, (FIG. 13 shows only 6 ACCUM_CLK_DATA bits at 204. It should be understood that to represent the decimal number "156" in binary, 8 bits are required. The parameter interface 108 would in this example provide bits 54 through 61 for entering the accumulation clock ratio which in turn would require all of the subsequent bit numbers to be increased by 2) the bit ratio would be entered at 206 as "0000011100011100", and the baud ratio (i.e. ratio based on bit rate rather than master clock) would be entered at 208 as binary "10".

Figure 14:
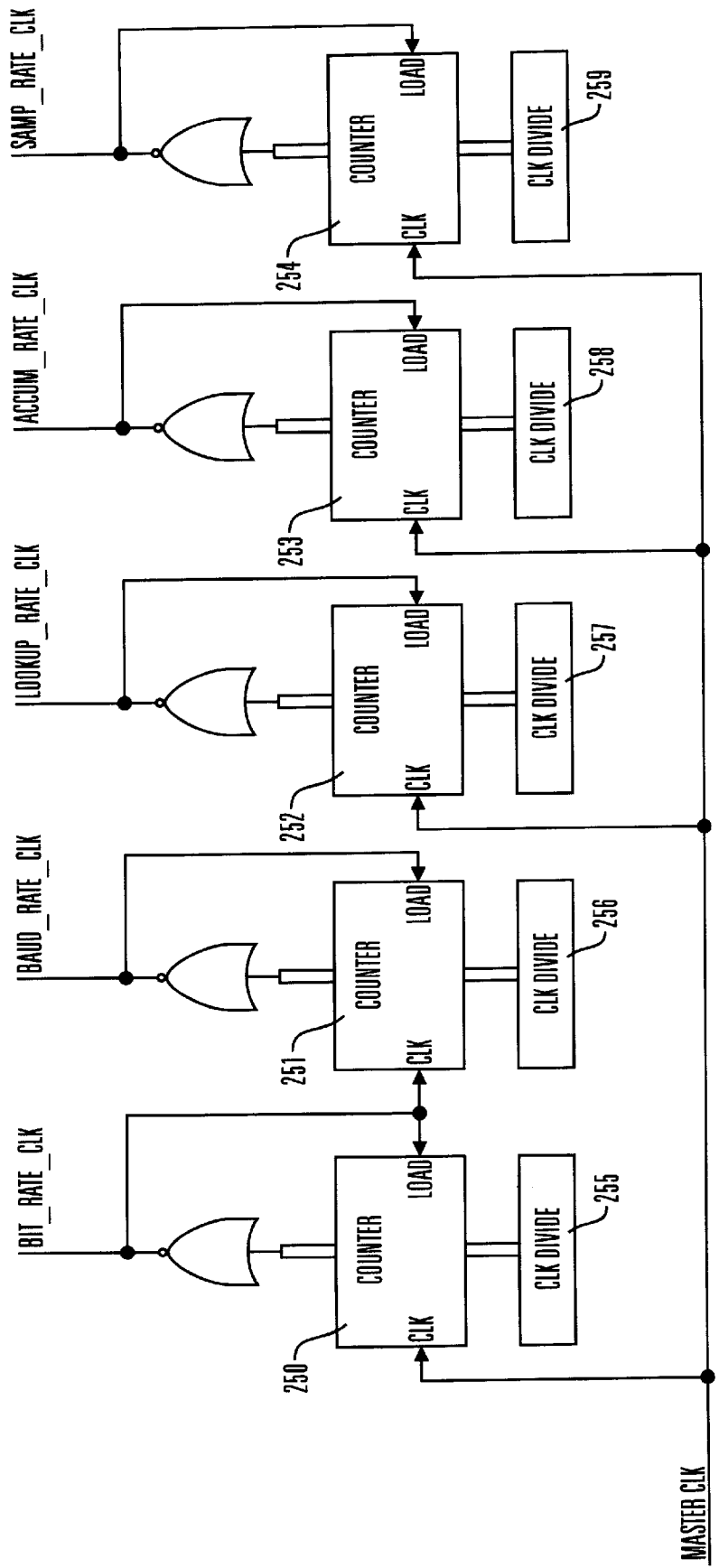
FIG. 14 is a detailed block diagram of a clock signal generator.

FIG. 14, is a block diagram showing one configuration of a clock generator 109 for implementing the user-defined inputs related to the system's timing requirements. The master clock is applied to bit counters 250, 251, 252, 253, and 254. Clock divide circuits 255, 256, 257, 258, and 259 use the user-defined inputs stored in the parameter input table to set a count-down value in the respective counters. For example, clock divide circuit 255 retrieves the bit clock ratio stored at 206 and sets counter 250 to 1819. Bit counter 250 subtracts 1 from this value on each clocked pulse from the 21.84 MHz master clock. When this value is reduced to zero, the bit counter 250 output goes low causing the NOR gate 260 to go high every 1820 clock pulses of the master clock creating a clock signal for a bit rate of 12 KHz.

User-defined inputs required for the address generator are also input to the parameter input table shown in FIG. 13 such as the filter length bits at 210 and the address counter bits 214. User-defined inputs describing the sine and cosine terms and related parameters required by the programmable state machine 184 of the data modulator 120 are likewise entered in binary form as the real/imaginary select bits at 216, the invert data bits at 218, the digital carrier bits at 220 and the symbol bit select bits at 222.

It should be readily understood that other programmable features could be utilized by the invention. Some examples include, providing one or more test modes which could be designated in the parameter input table as test bits 224, the use of one or more PROMs designated as bits 225 to accommodate real or imaginary data paths, designation of channel or mode bits 227 (e.g., traffic or pilot), scrambling seed bits 212, phase scrambling bit 226 used to configure the combining means 141 shown in FIG. 11 for data scrambling or for phase scrambling, and chip interface clock bits 228.

Within the In-Flight Phone system the communication channel is not always active. For this reason the modulator must be capable of shutting down and starting transmission without creating an out-of-band signal. To accomplish this each symbol will be accompanied by a bit indicating a Collapsed Constellation Zero, see bit 4 in FIG. 10b. This bit indicates that this symbol, called the ZERO symbol, must contribute zero amplitude to the output symbol. If ZERO symbols continue to be sent, the output waveform will go to zero amplitude after the band limiting filter completes its response to all previous non-zero symbols. Similarly, when the first non-zero symbol is written the channel will turn-on gradually according to the response of the band-limiting filter. Upon start-up, actual data transmission must be preceded by a period of a fixed amplitude carrier signal as is known in the art.

While the invention has been described and illustrated with reference to specific embodiments, those skilled in the art will recognize that modification and variations may be made without departing from the principles of the invention as described herein above and set forth in the following claims.

What is claimed:

1. An interpolator for use in a programmable digital modulator for generating samples of a sampled waveform to be transmitted, said samples of the sampled waveform being generated from at least one sequence of samples defining an accumulation of impulse response data values that are each representative of a known data input, said interpolator comprising:

pre-scaling circuitry for pre-scaling each impulse response data value by a number K, indicative of a number of additional samples to be generated to provide a desired frequency of the sampled waveform, and storing each impulse response data value in pre-scaled form:

a subtractor for receiving an input of consecutive scaled samples derived from the pre-scaled impulse response data a time between consecutive scaled samples defining an accumulation period, said subtractor determining a sample difference between a present scaled sample and a previous scaled sample; and an adder coupled to said subtractor for iteratively adding said sample difference to said previous scaled sample and redefining the result of said addition as the previous scaled sample, said adder repeating said addition said number K times during each said accumulation period to provide a desired frequency of the sampled waveform.

2. The interpolator of claim 1, further comprising a memory for storing the pre-scaled impulse response data values.

3. The interpolator of claim 1, wherein the number K is programmably modifiable.

* * * * *